US011621905B2

(12) United States Patent
Monier et al.

(10) Patent No.: US 11,621,905 B2
(45) Date of Patent: Apr. 4, 2023

(54) TRACEROUTE METHOD TO IDENTIFY DEVICES IN TUNNELED SEGMENT OF ROUTING PATH

(71) Applicant: Itron Global SARL, Liberty Lake, WA (US)

(72) Inventors: Fabrice Monier, Bry sur Marne (FR); Madani Lainani, Paris (FR)

(73) Assignee: Itron Global SARL, Liberty Lake, WA (US)

( * ) Notice: Subject to any disclaimer, the term of this patent is extended or adjusted under 35 U.S.C. 154(b) by 0 days.

(21) Appl. No.: 17/528,003

(22) Filed: Nov. 16, 2021

(65) Prior Publication Data

US 2022/0078100 A1 Mar. 10, 2022

Related U.S. Application Data

(63) Continuation of application No. 16/024,037, filed on Jun. 29, 2018, now Pat. No. 11,206,204.

(51) Int. Cl.
*H04L 12/26* (2006.01)
*H04L 12/46* (2006.01)
(Continued)

(52) U.S. Cl.
CPC .......... *H04L 43/12* (2013.01); *H04L 12/4633* (2013.01); *H04L 69/16* (2013.01); *H04L 69/18* (2013.01); *H04L 69/22* (2013.01)

(58) Field of Classification Search
CPC ..... H04L 43/12; H04L 12/4633; H04L 69/16; H04L 69/18; H04L 69/22; H04L 43/10; H04L 45/26; H04L 45/20
See application file for complete search history.

(56) References Cited

U.S. PATENT DOCUMENTS 10,148,688 B1 * 12/2018 Shavell ............... H04L 63/1466
10,277,353 B1 * 4/2019 Grammel ............ H04L 41/0895
(Continued)

FOREIGN PATENT DOCUMENTS

CN 107248941 A 10/2017
EP 1978703 A1 10/2008

OTHER PUBLICATIONS

Bonica et al, "RFC 3609 Tracing Requirements for Generic Tunnels", retrieved on Aug. 20, 2019 at <<URL:https:f/www.rfc-editor.orgjrfc/pdfrfc/rfc3609.txt.pdf>>, Sep. 30, 2003, 4 pages.

(Continued)

*Primary Examiner* — Schquita D Goodwin
(74) *Attorney, Agent, or Firm* — Lee & Hayes, P.C.

(57) ABSTRACT

Methods and devices for providing routing path and transit delay time data to a device running traceroute on an IP network comprising routing tunnels are described herein. In examples, a tunnel entrance device may copy a hop limit value associated with a traceroute probe into a hop limit field of a tunneled IP header. In other examples, the tunnel entrance device may perform address spoofing to generate an error message with a source address corresponding to an intermediate device disposed within a routing tunnel. In this way, a device executing traceroute may be able to receive network addresses corresponding to intermediate devices in a routing tunnel in order to perform network diagnostics, construct routing tables, determine more efficient routing paths, and so on.

17 Claims, 7 Drawing Sheets

(51) Int. Cl.
  *H04L 29/06* (2006.01)
  *H04L 43/12* (2022.01)
  *H04L 69/16* (2022.01)
  *H04L 69/18* (2022.01)
  *H04L 69/22* (2022.01)

(56) References Cited

U.S. PATENT DOCUMENTS

| | | |
|---|---|---|
| 2005/0207410 A1 | 9/2005 | Adhikari et al. |
| 2008/0080507 A1* | 4/2008 | Swallow ............. H04L 12/4633 370/392 |
| 2009/0238080 A1* | 9/2009 | Hirano ................ H04L 45/00 370/241 |
| 2012/0110152 A1 | 5/2012 | Wing et al. |
| 2013/0148547 A1 | 6/2013 | Page et al. |
| 2013/0322258 A1 | 12/2013 | Nedeltchev et al. |
| 2014/0105211 A1 | 4/2014 | Hui et al. |
| 2014/0126354 A1 | 5/2014 | Hui et al. |
| 2014/0169183 A1 | 6/2014 | Allan et al. |
| 2015/0256448 A1* | 9/2015 | Xiao ................... H04L 45/74 370/235 |
| 2015/0381459 A1 | 12/2015 | Xiao et al. |
| 2016/0269245 A1* | 9/2016 | Barnes ................ H04L 43/10 |
| 2016/0337426 A1* | 11/2016 | Shribman ............ H04L 65/612 |
| 2017/0078197 A1* | 3/2017 | Cj ...................... H04L 12/4633 |
| 2017/0250911 A1* | 8/2017 | Wakumoto ........... H04L 43/045 |
| 2017/0324651 A1* | 11/2017 | Penno .................. H04L 45/26 |
| 2017/0346932 A1 | 11/2017 | Hildebrand |
| 2018/0123903 A1* | 5/2018 | Holla .................. H04L 45/02 |
| 2018/0131617 A1* | 5/2018 | Hira .................... H04L 45/74 |
| 2018/0152374 A1 | 5/2018 | Yong et al. |
| 2018/0337839 A1* | 11/2018 | Bristow ............... H04L 41/12 |
| 2019/0123993 A1 | 4/2019 | Rangappagowda et al. |
| 2019/0238364 A1 | 8/2019 | Boutros et al. |
| 2019/0288873 A1 | 9/2019 | Camarillo Garvia et al. |
| 2019/0386915 A1 | 12/2019 | Paul |
| 2020/0007425 A1 | 1/2020 | Monier et al. |
| 2020/0127920 A1 | 4/2020 | Miao et al. |

OTHER PUBLICATIONS

Conta, RFC 2473, "Generic Packet Tunneling in IPv6 Specification", Network Working Group, Dec. 1998, pp. 1-36.

Grace, "Understanding Traceroute", retrieved on Aug. 20, 2019 at <<https:jjwww.techsupportalert.comjpdf/p1815.pdf>>, Nov. 30, 1998, 3 pages.

Hui et al., "An IPv6 Routing Header for Source Routes with the Routing Protocol for Low-Power and Lossy Networks ( RPL)," IETF RFC 6554, Mar. 2012, 13 pages.

Li, RFC 6145 IP / ICMP Translation Algorithm, 2011, 33 pages.

Non Final Office Action dated Apr. 1, 2020 for U.S. Appl. No. 16/024,037 "Traceroute Method to Identify Devices in Tunneled Segment of Routing Path," Monier, 11 pages.

Office Action for U.S. Appl. No. 16/024,037, dated Jun. 1, 2021, Monier, Traceroute Method to Identify Devices in Tunneled Segment of Routing Path,: 24 pages.

Office Action for U.S. Appl. No. 16/024,037, dated Aug. 13, 2020, Monier, "Traceroute Method to Identify Devices in Tunneled Segment of Routing Path", 18 pages.

Office Action for U.S. Appl. No. 16/024,037, dated Dec. 30, 2020, Monier, "Traceroute Method to Identify Devices in Tunneled Segment of Routing Path," 26 pages.

International Searching Authority, Written Opinion of PCT/US2019/039817, dated Jan. 2015 (Year: 2015).

PCT Search Report and Written Opinion dated Aug. 28, 2019 for PCT Application No. PCT/US2019/039817, 18 pages.

* cited by examiner

TRACEROUTE METHOD TO IDENTIFY DEVICES IN TUNNELED SEGMENT OF ROUTING PATH

RELATED APPLICATION

This application is a continuation of and claims priority to U.S. patent application Ser. No. 16/024,037, filed on Jun. 29, 2018, the disclosure of which is incorporated by reference herein.

BACKGROUND

Routing paths and transit delay times associated with sending a packet across an Internet Protocol (IP) network may be captured and stored for network diagnostics. In some instances, however, routing paths and transit delay times associated with sending a packet through a tunneled segment of an IP network may not be captured by, or visible to, a computing device executing a traceroute application or another probing application. Rather, existing traceroute techniques may not return data associated with a network device that is located downstream of a tunneled segment. Further, existing traceroute techniques may not return data corresponding to devices that comprise the tunneled segment. Thus, diagnosing problems in an IP network that comprises a tunneled network segment may be difficult for network personnel since they cannot see the full network and/or cannot determine where network congestion or errors may be occurring.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
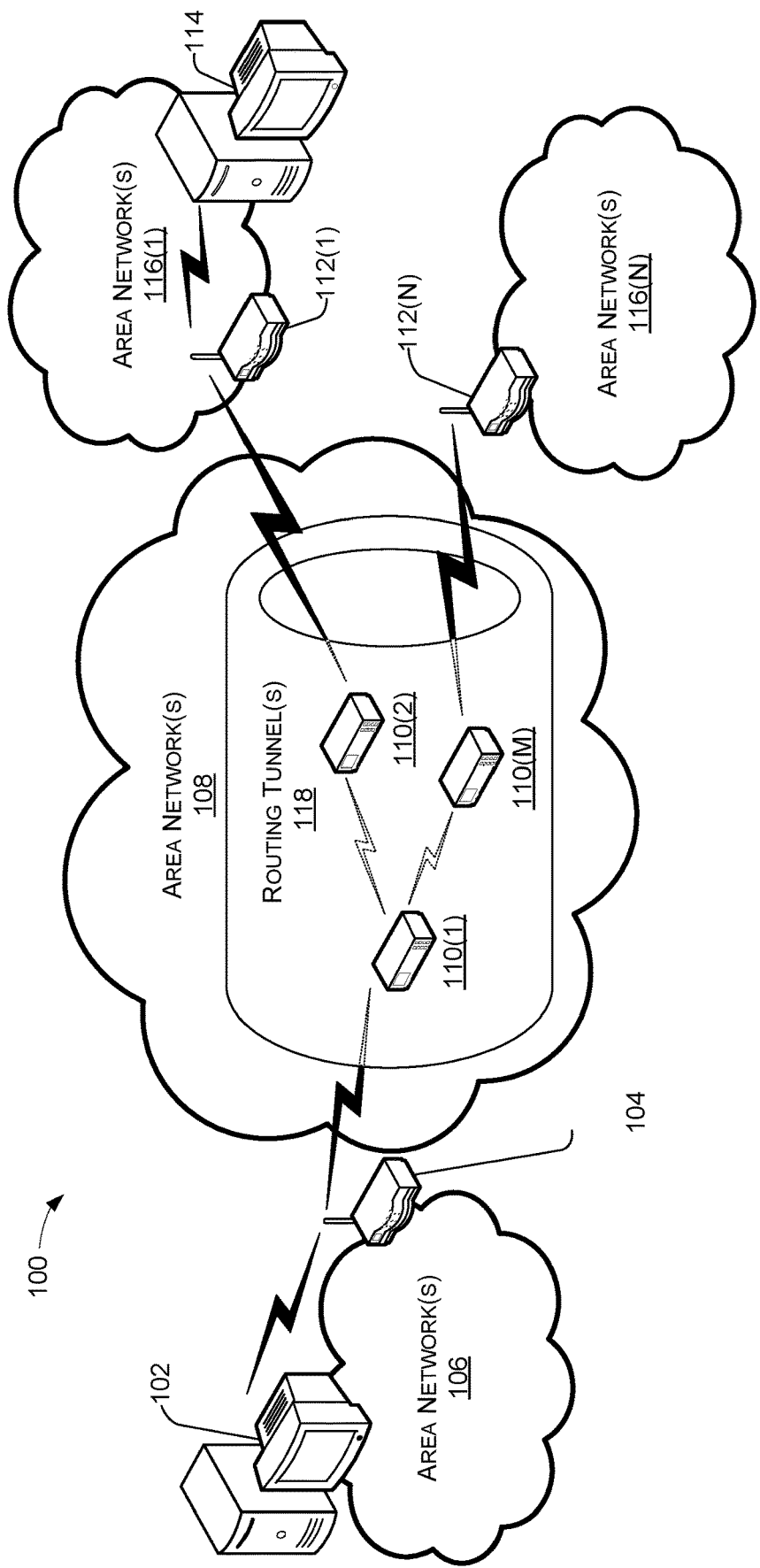
FIG. 1 is a schematic diagram of an example Internet Protocol (IP) network comprising a routing tunnel.

As discussed above, routing paths and transit delay times associated with sending a packet across an Internet Protocol (IP) network may be captured and stored for network diagnostics. In examples, a probe source device running a traceroute application or other probe application may determine a location within an IP network that is causing a communication delay or is unable to communicate with other devices within the IP network. Additionally, traceroute techniques can be used by an administrator to map a topology of a portion of the IP network. While examples described herein are given in terms of a traceroute application or traceroute command, the techniques are applicable to other types of probe applications and commands.

In examples, a traceroute application executing on a probe source device may begin by sending a probe request containing a hop limit value, referred to as a time to live (TTL) value in IPv4, to an unknown and/or unused UDP port of a probe destination device. The probe request may be received by an intermediate device disposed between the probe source device and the probe destination device on the routing path. The intermediate device may decrement the hop limit value of the probe request by one. The intermediate device may then forward the probe request to the next downstream device. The probe source device executing the traceroute application may also receive feedback for each probe request in the form of ICMPv6 Hop Limit Exceeded in transit error messages, or other types of error messages, from the downstream devices. The downstream devices may generate the error message indicating that the minimum hop limit value required to reach the probe destination device exceeds the hop limit value of the probe request. That is, when the hop limit value in the probe reaches zero, the intermediate, device that decremented the hop limit value to zero may send the error message to the probe source indicating that the hop limit has been depleted. The traceroute application executing on the probe source device may then store routing path and transit delay time data associated with the error message and send a new probe request to the probe destination device with an increased hop limit value. In examples, the hop limit value may be increased by 1 for each successive probe. In this way, each downstream device disposed on the routing path between the probe source device and the probe destination device may receive a probe with a hop limit value of one and, after decrementing the hop limit value to zero, generate an error message for the traceroute program to use in its diagnostics. This process may then repeat until an error in the routing path has been determined and/or the probe destination device is reached, as indicated by the probe source device executing the traceroute application receiving an ICMPv6 Port Unreachable error packet and/or another type of message indicating that the probe destination device was reached. While certain examples are provided in terms of ICMPVv6 messages for an IPv6 protocol, the techniques are not limited to the IPv6 protocol and may be applicable to other protocols and corresponding error messages as well. As one non-limiting example, the techniques may include sending/receiving ICMPv4 Port Unreachable error packets in the context of the IPv4 protocol.

Traditionally, the traceroute process described above may be implemented on an IP network for performing network diagnostics. However, when an IP network comprises one or more routing tunnels, the traceroute process may not be useful for diagnosing problems corresponding to the routing tunnel. In examples, when the hop limit value of a probe request expires at a tunneled intermediate device, the tunnel entrance device may be set as the destination address of an ICMPv6 Hop Limit Exceeded error message sent from the tunneled intermediate device. Accordingly, the error message associated with the probe may be ignored by the tunnel entrance device and/or may not be received by the probe source device executing the traceroute application.

Additionally, or alternatively, a tunnel entrance device may, by default, encapsulate any probe request packet it receives from a probe source device. For example, a tunnel entrance device may encapsulate the original probe packet within a tunneled IP packet comprising a new IP tunnel header. As a result, the hop limit value associated with the probe's IP header may be superseded by a hop limit value associated with the IP tunnel header. For example, after encapsulation by a tunnel entrance device, a probe request packet with a first hop limit value, for example 2, may be superseded by a default, second hop limit value for the IP tunnel header, for example 64. Thus, the probe request may be sent through a routing tunnel of an IP network to a tunnel exit device and/or a probe destination device without traceroute identifying any tunneled intermediate devices.

This disclosure describes techniques that enable providing a probe source device, which is executing a traceroute application, or other probe application, with routing paths and transit delay times associated with an intermediate device disposed within a tunneled segment of an IP network. Additionally, the techniques described herein may include modifying an IP tunnel header associated with an encapsulated traceroute probe. In examples, a tunnel entrance device located at a tunnel source endpoint may receive a traceroute probe from a probe source device executing a traceroute application or another probe application. The tunnel entrance device may then copy a hop limit value of the probe into a hop limit value field of the IP tunnel header for tunneling the probe through a routing tunnel of the IP network. By copying the hop limit value of the probe in this way, the hop limit value of the IP tunnel header for the encapsulated traceroute probe may expire at an intermediate device disposed within the routing tunnel of the IP network. Accordingly, the intermediate, tunneled device may generate an error message indicating that the hop limit value required to reach the probe destination device exceeded the hop limit value of the IP tunnel header for the encapsulated probe.

Additionally, in examples, a tunnel exit device may copy the hop limit value of the IP tunnel header of a tunneled probe request into the hop limit value field of the encapsulated probe request after decapsulation. For instance, the IP tunnel header of a tunneled probe request may have a first hop limit value, and the encapsulated probe request may have a second hop limit value. Take for example a routing tunnel that comprises one or more tunneled intermediate devices. In such an example, the tunneled intermediate devices will decrement the hop limit value of the tunneled probe request without decrementing the hop limit value of the encapsulated probe. As such, after decapsulation, the hop limit value of the probe request may not accurately represent the amount of hops the probe request has experienced. Accordingly, the tunnel exit device may, in order to compensate for the inaccurate hop limit value of the decapsulated probe, copy the hop limit value of the IP tunnel header of the tunneled probe request into the hop limit field of the decapsulated probe. In this way, the hop limit value of the probe request may expire at an intermediate device disposed on the routing path between the tunnel exit device and the probe destination device.

Implementing the techniques described in the above paragraphs may improve the underlying technology. For example, by copying the hop limit values of the probe specifically at the tunnel entrance and/or exit devices, the techniques described herein may be implemented in a network transparently without altering an underlying traceroute or another probe application. Therefore, this technique improves computer functionality for probe applications. Further, the techniques described herein may be performed on different types of networks, such as IPv6, IPv4, and others. By copying the original hop limit value of the probe message so that the hop limit may expire at a tunneled intermediate device, probe applications may be allowed to provide an accurate representation of an IP network and eliminate "blind spots" in a network picture associated with routing tunnels.

As used herein, a probe source device may be any computing device executing a probe application and sending probes to downstream devices. A tunnel entrance device may be any computing device that is within the IP network and is a tunnel source endpoint to one or more routing tunnels. The tunnel entrance device may tunnel communications from the probe source device to one or more downstream devices. The tunnel may be unidirectional in that traffic travels in one direction through the tunnel (e.g., traffic enters the tunnel at the tunnel entrance device and exits the tunnel at the tunnel exit device). However, multiple different tunnels may exist and the tunnel entrance device may additionally, or alternatively, serve as a tunnel exit device. A tunneled intermediate device may be any computing device that is located within a routing tunnel of an IP network and is located on a routing path between a tunnel entrance device and a tunnel exit device and/or a probe destination device. A probe destination device may be any computing device that a network administrator is ultimately trying to determine the routing path for using the probe application. Accordingly, the probe source device, the tunnel entrance device, the intermediate tunneled device and the probe destination device may be relays, meters, routers, switches, transformers, security gateways, combinations of any of these or other computing devices with routing capability (i.e., capable of routing communications from one device to another).

Additionally, as used herein the term "hop limit value" refers to a value corresponding to an IP packet header. For example, an IP packet header in IPv6 contains a hop limit value. Additionally, in IPv4, hop limit is referred to as time to live (TTL). In examples, hop limit and/or TTL may be associated with a value that limits the lifespan of data in a computer or network. In examples, a hop limit value may be an integer that is decremented by one each time a device with routing capability forwards the IP packet to a downstream device.

In examples, the techniques described herein may include a background application or daemon executing on the tunnel entrance device located at the tunnel source endpoint. The daemon provides the probe source device with information for the traceroute application. For example, the daemon operating on the tunnel entrance device may listen for ICMPv6 Hop Limit Exceeded error messages from one or more tunneled intermediate devices. In response to receiving such an error message, the daemon may generate anew ICMPv6 Hop Limit Exceeded error message containing the original probe request packet and an IP address corresponding to the specific tunneled intermediate device that generated the original error message. The daemon may then send the new error message to the probe source device running the traceroute application.

In examples, the daemon may perform address spoofing to set an IP source address of a new ICMPv6 and/or ICMPv4 error message to an IP address corresponding to a tunneled intermediate device. In examples, the daemon may copy the IP address of a tunneled intermediate device into an IP source address field for a new error message IP header. In this way, a probe source device executing a traceroute application may receive the new ICMPv6 and/or ICMPv4 error message and log any routing path or transit delay times associated with the communication for use in network diagnostics.

In some instances, the techniques described herein may be implemented at any node in a mesh network that is a tunnel source endpoint. For example, the tunnel source endpoint node may be an RPL (IPv6 Routing Protocol for Low-Power and Lossy Networks) DODAG Root node, but is not limited to this example. In examples, the tunnel source endpoint node may comprise a single tunnel entrance device for performing the described techniques or may comprise several tunnel entrance devices that perform the described techniques either together or individually. Additionally, the techniques described herein may be implemented on any device with IP routing capability. For example, the techniques may be implemented on a relay, meter, transformer, router, switch, security gateway, or another computing device with IP routing capability.

In examples, the probe source device may operate on a wide area network (WAN) or a backend utility network and communicate with one or more tunnel entrance devices. The probe source device, for instance, may be a network management system (NMS) operating on a backend utility network at a SCADA (supervisory control and data acquisition) center. However, the probe source device is not limited to such an example and may be any computing device that runs a traceroute or other network probe application. In examples, the probe source device may operate on a local area network (LAN) and communicate through a routing tunnel comprising one or more tunneled intermediate devices to a probe destination device operating on a personal area network (PAN).

In examples, the tunneled segment of the IP network may be an Adaptive Communications Technology (ACT) mesh network that comprises multiple devices between a tunnel entrance device located at a tunnel source endpoint and a tunnel exit device and/or a probe destination device. However, the tunneled segment is not limited to such an example and may be any type of tunneled segment in an IP network. For example, the tunneled segment of the IP network may comprise a single, intermediate device. In further examples, devices comprising the tunneled segment of the IP network may consist of different types of devices capable of performing IP routing. For instance, the tunneled segment of the IP network may be composed of relays, meters, transformers, routers, switches, gateways, or other computing devices with routing capability.

In examples, the probe destination device may serve as a personal area network (PAN) host comprising a RPL node of an ACT mesh network. However, the probe destination device is not so limited by the above example and may be any device that is the probe destination device for an IP message. Accordingly, the probe destination device may be a relay, meter, router, switch, transformer, security gateway, or another computing device.

Further, the addition of the techniques described herein into an IP network may be transparent. For example, classical traceroute methods may still be used by a probe source device within the network without any changes to the traceroute application itself. Furthermore, the techniques described herein may be applied to any IPv6 or IPv4 network that is using tunnels. For example, the described techniques may be applied to an ACT mesh network, a virtual private network (VPN), or another tunneled network.

The present disclosure provides an overall understanding of the principles of the structure, function, and use of the devices and methods disclosed herein. One or more examples of the present disclosure are illustrated in the accompanying drawings. Those of ordinary skill in the art will understand that the devices and methods specifically described herein and illustrated in the accompanying drawings are non-limiting embodiments. The features illustrated or described in connection with one embodiment may be combined with the features of other embodiments, including as between devices and methods. Such modifications and variations are intended to be included within the scope of the appended claims.

Additional details are described below with reference to several examples.

Example Environment

FIG. 1 is a diagram illustrating an example IP network architecture 100. The architecture 100 includes multiple network communication devices. The network communication devices may include a probe source device 102. In some illustrations, the probe source device 102 may be a data concentrating unit, automation device, a network management system (NMS) or another computing device capable of executing a probe application. In one example, the probe source device 102 is a network communication device executing traceroute and logging network data for performing diagnostics. In examples, the traceroute application executing on the probe source device 102 may send a probe to a downstream network communication device for gathering routing paths, transit delay times, and other network associated data. The probe source device 102 may further receive and store such network associated data for performing network diagnostics.

The network communication devices also include an edge device, such as tunnel entrance device 104. As shown in FIG. 1, tunnel entrance device 104 may serve as a tunnel source endpoint for tunneling and sending IP messages to a downstream device during normal operation. The tunnel entrance device 104 may include, but is not limited to, a field area router (FAR), a cellular relay, a cellular router, a transformer, an edge router, a DODAG (Destination Oriented Directed Acyclic Graph) root, a root device or node of area network 106, a combination of the foregoing, or the like. In the illustrated example of FIG. 1, the tunnel entrance device 104 may tunnel communications from area network 106 to one or more downstream devices in area network 108. The tunnel entrance device 104 may comprise any type of edge device depending on the given network and topology.

The probe source device 102 and the tunnel entrance device 104 are in communication with one another via an area network (AN) 106. As used herein, the term "area network" refers to a defined group of devices that are in communication with one another via one or more wired or wireless links. Examples of area networks include, for example, wide area networks (WANs), local area networks (LANs), neighborhood area networks (NANs), personal area networks (PANs), home area networks (HANs), Field Area Networks (FANs), or the like. While only two area networks are shown in FIG. 1, in practice, multiple ANs may exist and may collectively define a larger network, such as an advanced metering infrastructure (AMI) of a utility communication network. At any given time, each individual device may be a member of a particular area network. Over time, however, devices may migrate from one area network to another geographically proximate or overlapping area network based on a variety of factors, such as respective loads on the area networks, interference, or the like. In examples, AN 106 could be a LAN at a SCADA center associated with a utility provider.

The term "link" refers to a direct communication path between two network devices (without passing through or being relayed by another device). A link may be over a wired or wireless communication path. Each link may represent a plurality of channels over which a device is able to transmit or receive data. Each of the plurality of channels may be defined by a frequency range which is the same or different for each of the plurality of channels. In some instances, the plurality of channels comprises radio frequency (RF) channels.

In some examples, area networks 106, 108, and 116 shown in FIG. 1 may comprise a mesh network, in which the network communication devices relay data through ANs 106, 108, and 116. Regardless of the topologies of ANs 106, 108, and 116, individual network communication devices may communicate by wireless (e.g., radio frequency) and/or wired (e.g., power line communication, Ethernet, serial, etc.) connections.

The network communication devices also include tunneled intermediate device(s) 110(1), 110(2), . . . 110(M) (collectively referred to as "tunneled intermediate devices 110"), where M is any integer greater than or equal to 1. The tunneled intermediate devices 110 may perform IP routing to forward IP messages to downstream devices. The tunneled intermediate devices 110 may comprise relays, switches, meters, transformers, or other computing devices with IP routing capability. As shown in FIG. 1, the tunneled intermediate devices 110 may comprise part of a routing tunnel 118. In some instances, the tunneled intermediate devices 110 may be relay nodes within an ACT mesh network and/or may be routers located between a DODAG Root and a RPL node. However, the tunneled intermediate devices 110 are not limited to such examples.

The tunneled intermediate devices 110 may route IP messages from the tunnel entrance device 104 to one or more tunnel exit devices 112(1), . . . 112(N) (collectively "tunnel exit devices 112"), where N is any integer greater than or equal to zero. In examples, the tunnel exit devices 112 may be the same as, or similar to, tunnel entrance device 104. As such, while the tunnel is unidirectional (i.e., traffic travels in one direction through the tunnel), multiple different tunnels may exist and the tunnel entrance device 104 may serve, at times, as a tunnel exit device of another tunnel.

The network communication devices may also include a probe destination device 114. In examples, the probe destination device 114 and the tunnel exit devices 112 may be in communication with one another via area network 116(N). For example, the probe destination device 114 may receive IP messages from the tunnel exit device 112(N). Additionally, or alternatively, the probe destination device 114 may serve as a probe source device, similar to probe source device 102. In examples, the probe destination device 114 may be an NMS operating on a backend utility network at a SCADA center.

In examples, the routing tunnel 118 may comprise a single device. Additionally, or alternatively, the routing tunnel 118 may comprise multiple devices. Moreover, a routing path in an IP network may comprise multiple nested or sequential routing tunnels disposed on the routing path between a probe source device 102 and a probe destination device 114. As shown in FIG. 1, routing tunnel 118 may comprise multiple paths, such as the two alternate paths shown between intermediate device 110(1), and intermediate devices 110(2) and 110(M). In some examples, however, the routing tunnel 118 may consist of a single path.

Example Network Communications Devices

Figure 2:
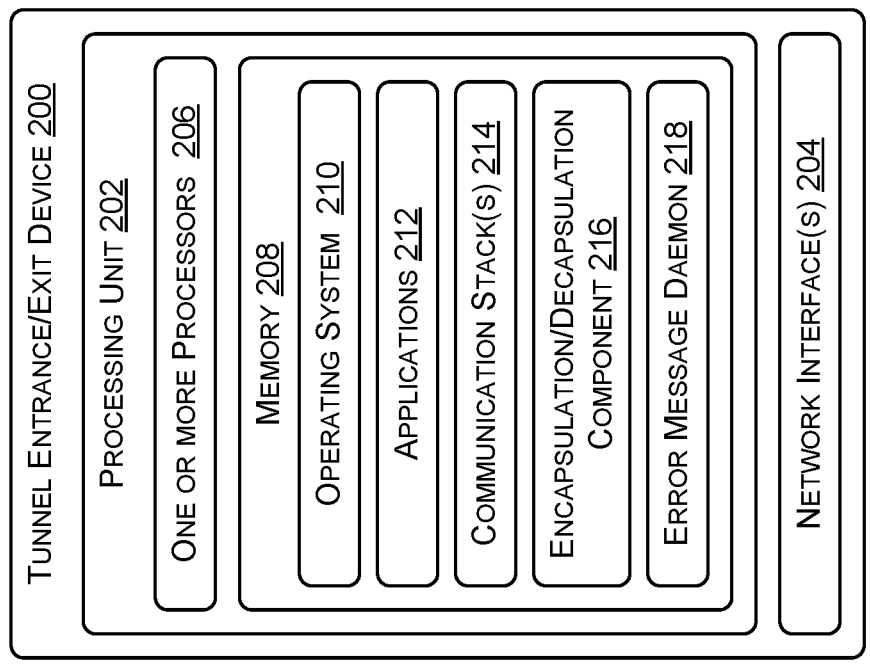
FIG. 2 is a schematic diagram showing example detail of a tunnel entrance device that receives a traceroute command.

FIG. 2 is a schematic diagram showing example detail of a tunnel entrance and/or tunnel exit device 200. As discussed above, tunnel entrance and/or exit devices may take numerous different forms, depending on the industry and context in which they are deployed. Different types of tunnel entrance and/or exit devices may have different physical and/or logical components, and FIG. 2 should not be read as to limit the scope of such tunnel entrance and/or exit devices.

As shown in FIG. 2, the example tunnel entrance and/or exit device 200 may include a processing unit 202 and one or more network interfaces 204 (e.g., transceiver, radio, antenna, ethernet module, power line communication module, etc.). The processing unit 202 may include one or more processors 206 and memory 208. When present, the one or more processors 206 may comprise microprocessors, central processing units, graphics processing units, or other processors usable to execute program instructions to implement the functionality described herein. Additionally, or alternatively, in examples, some or all of the functions described may be performed in hardware, such as an application specific integrated circuit (ASIC), a gate array, or other hardware-based logic device.

The network interface(s) 204 may include a transceiver comprised of one or more hardware and/or software implemented radios to provide two-way RF communication with other network communication devices. The network interface(s) 204 may additionally or alternatively comprise a small form-factor pluggable (SFP) transceiver, or other transceiver capable of providing IPv6, IPv4, or other ethernet communication with other network devices. The network interface(s) 204 may additionally or alternatively include a modem to provide power line communication (PLC) communication with other network communication devices that are connected to an electrical service grid.

The memory 208 may include an operating system (OS) 210 and one or more applications 212 that are executable by the one or more processors 206. The memory 208 may also include one or more communication stacks 214. In examples, the communication stack(s) 214 may be configured to implement an IPv6 or IPv4 Routing Protocol, RPL, and/or another protocol. However, other protocols may be used depending on the networks with which the device is intended to be compatible. The communication stack(s) 214 describe the functionality and rules governing how the tunnel entrance and/or exit device 200 interacts with each of the specified types of networks. For instance, the communication stack(s) 214 may store routing tables associated with one or more routing paths, IP addresses associated with networked devices, and the like.

The memory 208 may also include an encapsulation/decapsulation component 216 for encapsulating and/or decapsulating an IP packet or other message. In examples, if the tunnel entrance/exit device 200 is acting as a tunnel entrance device, the encapsulation/decapsulation component 216 may work simultaneously with the communication stack(s) 214 to encapsulate an IP packet for sending through a network tunnel to a probe destination device. In this way, the communication stack(s) 214 may provide the encapsulation/decapsulation component 216 with an IP address corresponding to an intermediate device disposed within a routing tunnel between the tunnel entrance and/or exit device and a probe destination device. Alternatively, or additionally, if the tunnel entrance/exit device 200 is acting as a tunnel exit device, the encapsulation/decapsulation component 216 may work simultaneously with the communication stack(s) 214 to decapsulate a tunneled (encapsulated) IP packet for sending the IP packet to a non-tunneled device.

The memory 208 may also include an error message daemon 218. In examples, the error message daemon 218 may execute as a background process and listen for an error message, such as, for example, an ICMPv6 Hop Limit Exceeded in Transit packet. In this way, the error message daemon 218 may detect such an error message, determine an address associated with a tunneled intermediate device that generated the error message, and regenerate a new error message comprising an IP address of the tunneled intermediate device. The error message daemon 218 may then send the new error message via the network interface(s) 204.

Figure 3:
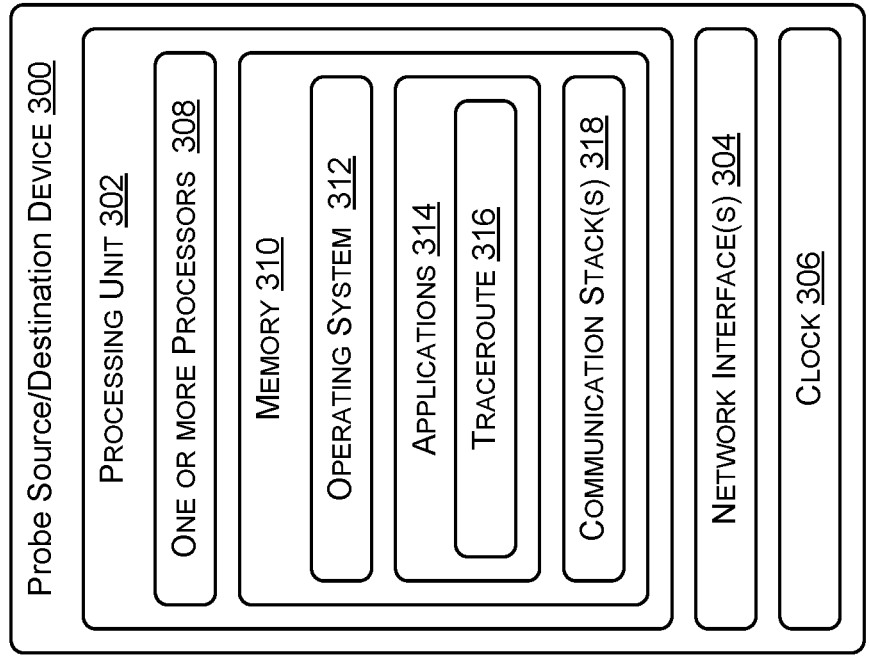
FIG. 3 is a schematic diagram showing example detail of a probe source device that initiates a traceroute command.

FIG. 3 is a schematic diagram showing example detail of a probe source device 300. As discussed above, probe source devices may take numerous different forms depending on the industry and context in which they are deployed. Different types of probe source devices may have different physical and/or logical components, and FIG. 3 should not be read as to limit the scope of such probe source devices.

As shown in FIG. 3, the example probe source device 300 includes a processing unit 302, one or more network interfaces 304 (e.g., transceiver, radio, power line communication module, ethernet module, etc.), and a clock 306. The processing unit 302 may include one or more processors 308 and memory 310. When present, the one or more processors 308 may comprise microprocessors, central processing units, graphics processing units, or other processors usable to execute program instructions to implement the functionality described herein. Additionally, or alternatively, in examples, some or all of the functions described may be performed in hardware, such as an application specific integrated circuit (ASIC), a gate array, or other hardware-based logic device.

The network interface(s) 304 may include a transceiver comprised of one or more hardware and/or software implemented radios to provide two-way RF communication with other network communication devices. The network interface(s) 304 may additionally or alternatively comprise a small form-factor pluggable (SFP) transceiver, or other transceiver capable of providing IPv6, IPv4, or other ethernet communication with other network devices. The network interface(s) 304 may additionally or alternatively include a modem to provide power line communication (PLC) communication with other network communication devices that are connected to an electrical service grid.

The clock 304 may comprise a real-time clock (RTC), such as an integrated circuit or other hardware-based clock, which keeps track of the current time for the probe source device 300. In examples, the clock 304 may be configured to be updated or synchronized. The clock 304 may be used to determine a transit delay time associated with sending and receiving an IP packet. For instance, the clock 304 may be able to determine a total round-trip time corresponding to sending an IP packet to a downstream device, and receiving a response IP message from the downstream device. In examples, a round-trip time associated with sending an IP packet and receiving a response from a downstream device may be measured as the relative difference between the time the probe request was sent and the time the probe source device received the probe reply.

The memory 310 may include an operating system (OS) 312 and one or more applications 314 that are executable by the one or more processors 308. The one or more applications may include a traceroute 316 application or other probe application used for performing network diagnostics. In examples, the traceroute 316 application may send probe requests to downstream devices to determine routing paths and transit delay times associated with an IP network or a tunneled segment of an IP network.

The memory 310 may also include one or more communication stacks 318. In examples, the communication stack(s) 318 may be configured to implement an IPv6 or IPv4 Routing Protocol, RPL, and/or another protocol. However, other protocols may be used depending on the networks with which the device is intended to be compatible. The communication stack(s) 318 describe the functionality and rules governing how the probe source device 300 interacts with each of the specified types of networks. For instance, the communication stack(s) 318 may store routing tables associated with one or more routing paths, IP addresses associated with networked devices, and the like. In some illustrations, the communication stack(s) 318 may operate with the traceroute 316 application to determine routing paths, transit delay times, and other network associated data.

Example Processes

Figure 4:
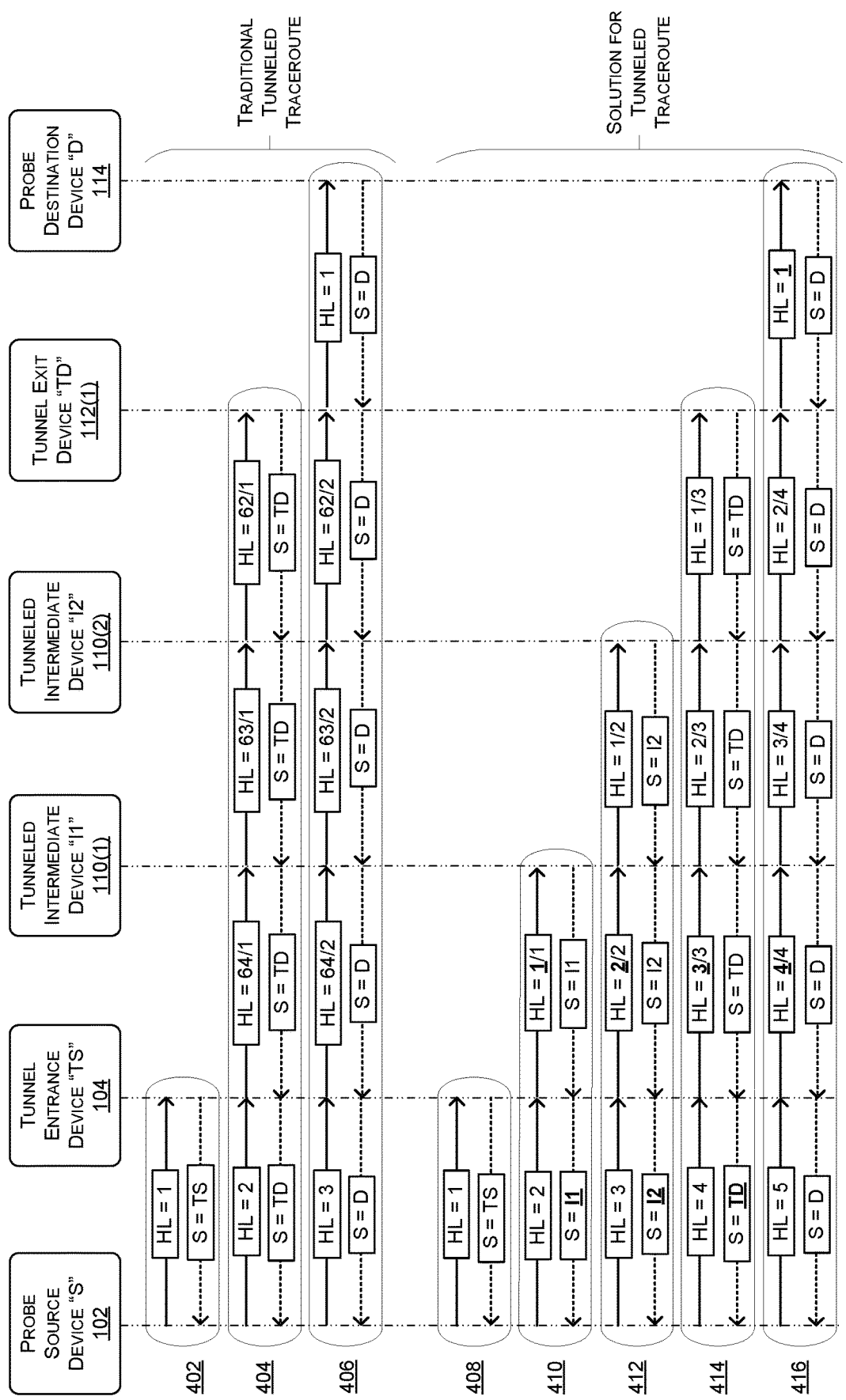
FIG. 4 is a signal flow diagram showing a comparison between the techniques described herein, and conventional traceroute behavior on a tunneled network segment.

FIG. 4 is a signal flow diagram showing a comparison of conventional traceroute behavior on a tunneled network segment as opposed to traceroute behavior according to the techniques described herein.

With conventional traceroute behavior on a tunneled network segment, at 402, a traceroute application executing on the probe source device 102 may send a first probe request to the probe destination device 114 with a hop limit value of one (HL=1). The tunnel entrance device 104 may receive the first probe, decrement the hop limit value to zero (HL=0), and then send an ICMPv6 Hop Limit Exceeded in transit error message back to the prove source device 102. The error message may contain the source address of the tunnel entrance device 104, i.e., the IP address of the tunnel entrance device 104 (S=TS).

At 404, after receiving the error message, the traceroute application executing at the probe source device 102 may send a second probe request to the probe destination device 114 with a hop limit value of 2 (HL=2). The tunnel entrance device 104 may receive the second probe, decrement the hop limit value by one (HL=1), and then encapsulate the second probe within an IP tunnel header. In doing such, the tunnel entrance device 104 may set the hop limit value of the IP tunnel header to a default value, such as 64. As shown in FIG. 4, the hop limit value of the tunnel header supersedes the hop limit value of the second probe request (HL=X/Y where X is the outer tunnel header hop limit, in this case 64, and Y is the inner header (tunneled) hop limit, in this case 1). The tunneled probe request is then forwarded downstream by the tunnel entrance device 104 to tunneled intermediate device 110(1). Intermediate device 110(1) may receive the tunneled probe message, decrement the outer tunnel header hop limit value by 1 (HL=63/1), and then forward the tunneled probe request message downstream to intermediate device 110(2). Intermediate device 110(2) may receive the tunneled probe request, decrement the outer tunnel header hop limit value by 1 (HL=62/1), and then forward the tunneled probe request downstream to the tunnel exit device 112(1). The tunnel exit device 112(1) may receive the encapsulated second probe request and, in response, de-encapsulate the probe request. After the probe request is de-encapsulated, the tunnel exit device 112(1) may decrement the original probe request hop limit value by one (HL=0) and send an ICMPv6 Hop Limit Exceeded in Transit error packet back to the probe source device 102. The error message may contain the source address of the tunnel exit device 112(1) (S=TD).

At 406, after receiving the hop limit exceeded error message from the tunnel exit device 112(1), the traceroute application executing at the probe source device 102 may send a third probe request to the probe destination device 114 with a hop limit value of 3 (HL=3). The process for routing the probe request downstream toward the probe destination device 114 may be the same as, or similar to, the process described above in step 404, at least until the probe request is received by the tunnel exit device 112(1). As shown in FIG. 4, when the tunneled probe request is received by the tunnel exit device 112(1), the hop limit value of the tunneled probe may be HL=62/2, where 62 represents the hop limit value of the tunnel header and 2 represents the hop limit value of the encapsulated third probe. As such, the tunnel exit device 112(1) may receive and/or de-encapsulate the third probe request. After the probe request is de-encapsulated, the tunnel exit device 112(1) may decrement the original probe request hop limit value by one (HL=1) and forward the third probe request to the probe destination device 114. The probe destination device 114 may receive the third probe request, generate an ICMPv6 Port Unreachable error message, and then send the error message back to the probe source device 102. The error message may contain the IP address of the probe destination device (S=D). Thus, as described above, the traceroute application executing at the source device 102 may never receive ICMPv6 Hop Limit Exceeded in transit error packets from the tunneled intermediated devices 110(1) and/or 110(2). Therefore, the traceroute application may never determine a detailed routing path or transit delay time associated with sending an IP packet through the tunneled network segment to devices located downstream of the tunnel entrance device 104.

Using the techniques described herein for operating a traceroute application on a tunneled network segment, at 408 a traceroute application executing at the probe source device 102 may send a first probe to the probe destination device 114 with a hop limit value of one (HL=1). The tunnel entrance device 104 may receive the first probe, decrement the hop limit value to zero (HL=0), and then send an ICMPv6 Hop Limit Exceeded in transit error message back to the probe source device 102. The error message may contain the IP address of the tunnel entrance device 104 (S=TS).

At 410, after receiving the error message from the tunnel entrance device 104, the traceroute application executing on the probe source device 102 may send a second probe to the probe destination device 114 with a hop limit value of two (HL=2). The tunnel entrance device 104 may receive the second probe, decrement the hop limit value (HL=1), and then encapsulate the second probe within an IP tunnel header. In doing so, the tunnel entrance device 104 may copy the decremented hop limit value of the second probe into a hop limit field for the IP tunnel header (HL=1/1); (here, HL= X/Y where X is the outer tunnel header hop limit copied from the probe, in this case 1, and Y is the inner header (tunneled) hop limit, in this case also 1). The tunneled probe request is then forwarded by the tunnel entrance device 104 to tunneled intermediate device 110(1). Tunneled intermediate device 110(1) receives the tunneled probe request, decrements the outer tunnel header hop limit value by 1 (HL=0/1), and then sends a hop limit exceeded error message containing the source address of tunneled intermediate device 110(1) back to the tunnel entrance device 104. Because the destination address of the error message may be intended for the tunnel entrance device 104, a daemon executing on the tunnel entrance device 104 may detect the hop limit exceeded error message and generate a new hop limit exceeded error message containing the IP address of the tunneled intermediate device 110(1) (S=I1), and send the error message to the probe source device 102. In this way, the probe source device 102 may receive the hop limit exceeded error message from the tunneled intermediate device 110(1), which may otherwise have been ignored by the tunnel entrance device 104.

At 412, after receiving the error message from the tunneled intermediate device 110(1), the traceroute application executing on the probe source device 102 may send a third probe to the probe destination device 114 with a hop limit value of three (HL=3). The tunnel entrance device 104 may receive the third probe, decrement the hop limit value (HL=2), and then encapsulate the third probe within an IP tunnel header. Like in step 410, the tunnel entrance device 104 may copy the current hop limit value of the third probe into the new hop limit value of the IP tunnel header (HL=2/2). The tunneled probe request is then forwarded by the tunnel entrance device 104 to the tunneled intermediate device 110(1). Tunneled intermediate device 110(1) may receive the tunneled probe message, decrement the outer tunnel header hop limit value by 1 (HL=1/2), and forward the tunneled probe request to tunneled intermediate device 110(2). Tunneled intermediate device 110(2) may receive the tunneled message, decrement the outer tunnel header hop limit value by 1 (HL=0/2), and then send a hop limit exceeded error message containing the source address of intermediate device 110(2) back to the tunnel entrance device. Like in 410, the application/daemon executing on the tunnel entrance device 104 detects the error message, generates a new error message containing the IP address of tunneled intermediate device 110(2), and sends the error message to the probe source device 102.

At 414, after receiving the error message from the tunneled intermediate device 110(2), the traceroute application executing on the probe source device 102 may send a fourth probe request to the probe destination device 114 with a hop limit value of four (HL=4). The tunnel entrance device 104 may receive the fourth probe request, decrement the hop limit value (HL=3), and then encapsulate the fourth probe request within an IP tunnel header. As such, the process for routing the fourth tunneled probe message downstream may be the same as, or similar to, the process described above with respect to step 412. However, in this instance the fourth tunneled probe request may be forwarded by the tunneled intermediate device 110(2) to the tunnel exit device 112(1) because of the increased hop limit value of the fourth probe request. Accordingly, the tunnel exit device 112(1) may receive the fourth tunneled probe request. In examples, the tunnel exit device 112(1) may de-encapsulate the fourth probe message and replace the hop limit value of the encapsulated fourth probe (in this case 3) with the outer tunnel header hop limit value (in this case 1). As such, after copying the tunnel header hop limit value into the hop limit field of the fourth probe request, the tunnel exit device 112(1) may decrement the hop limit value of the fourth probe request to zero (HL=0). Accordingly, the tunnel exit device 112(1) may send a hop limit exceeded error message back to the probe source device 102 containing the IP address of the tunnel exit device 112(1). In examples, the error message may be forwarded naturally to the probe source device 102 from the tunnel entrance device 104 because the error message was not generated by a device within the routing tunnel.

At 416, after receiving the error message from the tunnel exit device 112(1), the traceroute application executing on the probe source device 102 may send a fifth probe request to the probe destination device 114 with a hop limit value of five (HL=5). In examples, the fifth probe request may be routed to the tunnel exit device 112(1) by a process that is the same as or similar to the processes described above. However, because of the increased hop limit value of the fifth probe request, the tunnel exit device 112(1) may forward the fifth probe request to the probe destination device 114. Accordingly, the probe destination device 114 may receive the fifth probe request and because, at least in examples, each probe request may be addressed to an unknown and/or un-used UDP port of the probe destination device 114, the probe destination device 114 may generate an ICMPv6 Port Unreachable error message, or another type of message. The message may then be sent by the probe destination device 114 back to the probe source device 102, which may then recognize the port unreachable message and cease generating probe requests.

Figure 5:
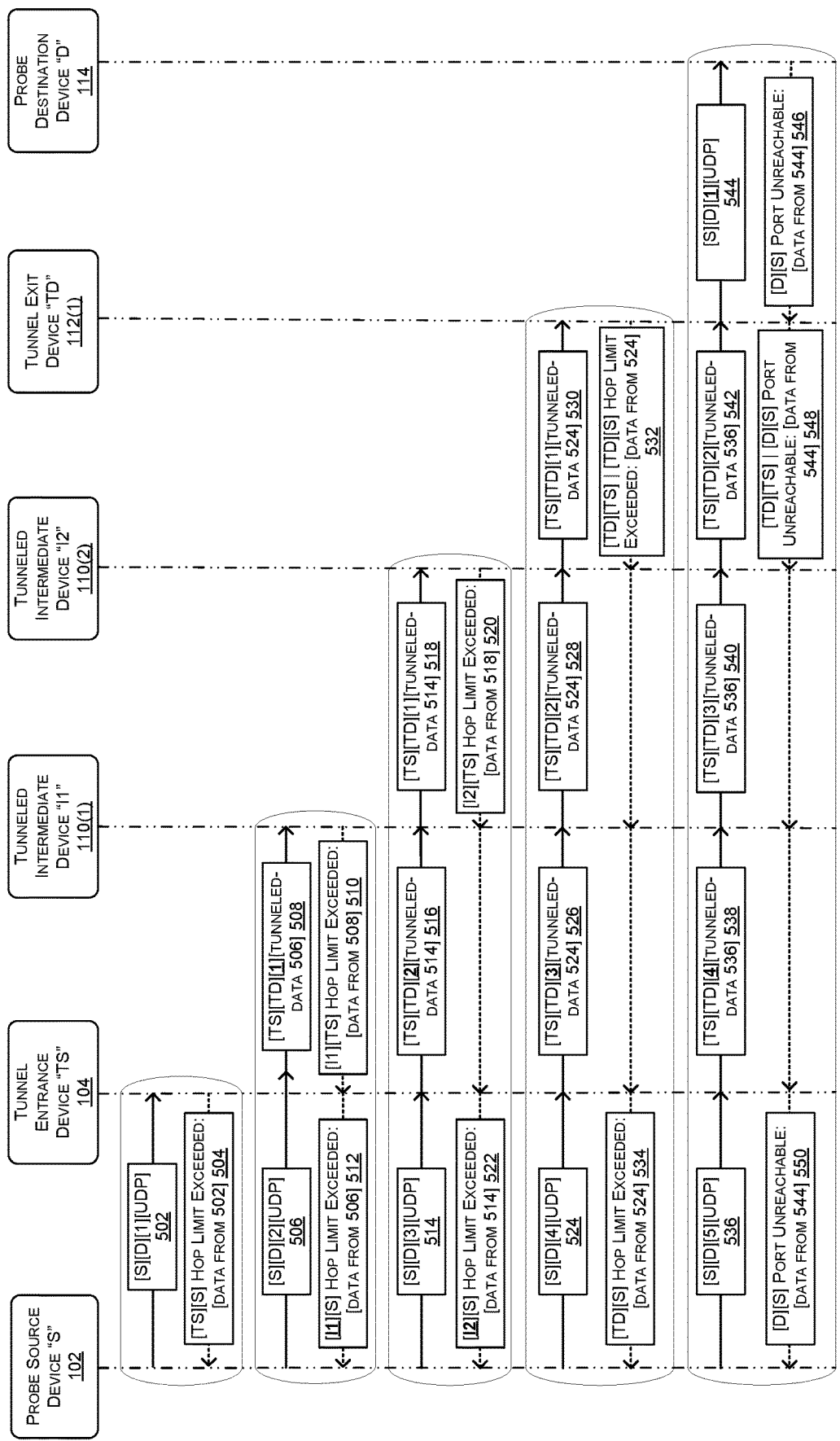
FIG. 5 is a signal flow diagram illustrating example traceroute communications on a tunneled segment of an IP network using the methods described herein.

FIG. 5 is a signal flow diagram illustrating detailed traceroute communications on a routing tunnel of an IP network according to the techniques described herein. Although FIG. 5 is an example implementation of the described technique using a UDP protocol, the described technique is not limited to implementation using UDP and may be applied using, for example, TCP protocol, ICMPv6 protocol, ICMPv4 protocol, as well as other communication protocols.

At 502, a traceroute application executing on the probe source device 102 may send a first probe request to the probe destination device 114. As used herein, FIG. 5 uses the following convention for an IP header: [source address] [destination address] [hop limit] [UDP payload]. Therefore, and as shown in block 502, the source address of the IP header for the first probe corresponds to probe source device 102 ([S]), the destination address of the IP header for the first probe corresponds to probe destination device 114 ([D]), and the hop limit of the IP header for the first probe is initially set to one ([1]).

At 504, the tunnel entrance device 104 may receive the first probe request described in block 502, decrement the hop limit value of the probe to zero, and generate an ICMPv6 Hop Limit Exceeded in transit error message. As shown in block 504, the source address of the IP header of the error message corresponds to tunnel entrance device 104 ([TS]), the destination address corresponds to probe source device 102 ([S]), and the first probe request is encapsulated in the error message ([DATA FROM 502]). As used herein, and in examples, a hop limit value is not shown for error messages as error messages may customarily be assigned a hop limit value large enough for the error message to reach the destination. After receiving the error message, the probe source device 102 and/or the traceroute application executing on the probe source device 102 may log the IP address corresponding to the tunnel entrance device 104 and/or may determine the round-trip time for the exchange for performing network diagnostics, updating routing tables, etc.

At 506, the traceroute application executing on the probe source device 102 may send a second probe request to the probe destination device 114. As shown in block 506, the source address of the IP header for the second probe corresponds to probe source device 102 ([S]), the destination address of the IP header for the second probe corresponds to probe destination device 114 ([D]), and the hop limit of the IP header for the second probe has been incremented and set to two ([2]). In some instances, sending the second probe request may be in response to receiving the error message from the tunnel entrance device 104. In further examples, sending the second probe may be based in part on the IP header of the error message not having a source address corresponding to the probe destination device 114.

At 508, the tunnel entrance device 104 may receive the second probe request described in block 506, decrement the hop limit value of the second probe request ([1]), and encapsulate the second probe request into a tunneled message. During the encapsulation process, the tunnel entrance device 104 may copy the hop limit value of the second probe request IP header into a hop limit value field for an IP tunnel header of the encapsulated second probe, rather than setting the hop limit of the tunnel header to a default value. As shown in block 508, the tunnel entrance device 104 may also set the source address of the tunnel header to its own address ([TS]), set the destination address of the tunnel header to tunnel exit device 112(1) ([TD]), and encapsulate the original probe data from block 506 ([TUNNELED-DATA 506]). The tunnel entrance device 104 may then send the tunneled probe request message to tunneled intermediate device 110(1).

At 510, the tunneled intermediate device 110(1) may receive the tunneled probe request message described in block 508, decrement the hop limit value of the IP tunnel header of the probe to zero, and generate an ICMPv6 Hop Limit Exceeded error message. As shown in block 510, the source address of the error message corresponds to tunneled intermediate device 110(1) ([I1]), the destination address of the IP tunnel header of the error message is set to tunnel entrance device 104 ([TS]), and the data from the tunneled message shown in block 508 is included in the error message. The tunneled intermediate device 110(1) may then send the error message to the tunnel entrance device 104.

At 512, the tunnel entrance device 104 may receive the error message described in block 510. In some instances, an application/daemon executing on the tunnel entrance device 104 may detect the error message, generate a new ICMPv6 Hop Limit Exceeded error message, and send the error message to the probe source device 102, rather than ignoring the error message. In examples, the application/daemon executing on the tunnel entrance device 104 may perform address spoofing and set the source address of IP header of the error message to the address of tunneled intermediate device 110(1) who generated the original error message. As shown in block 512, the source address of the IP header of the newly generated error message corresponds to tunneled intermediate device 110(1) ([I1]), the destination address of the IP header of the error message is set to the probe source device 102 ([S]), and the data from the original probe message shown in block 506 is included in the error message. The tunnel entrance device 104 may then send the error message to the probe source device 102. The probe source device 102 may then receive the error message. Additionally, the traceroute application executing on the probe source device 102 and/or the probe source device 102 may log the IP address corresponding to the intermediate device 110(1) and/or the roundtrip time for the exchange for performing network diagnostics, creating routing tables, etc.

At 514, the traceroute application executing on the probe source device 102 may send a third probe request to the probe destination device 114. As shown in block 514, the source address of the IP header for the third probe corresponds to probe source device 102 ([S]), the destination address of the IP header for the third probe corresponds to probe destination device 112(1) ([D]), and the hop limit of the IP header for the third probe has been incremented and set to three ([3]). In some instances, sending the third probe request may be in response to receiving the error message from the tunneled intermediate device 110(1) described in block 512. In further examples, sending the third probe may be based in part on the IP header of the error message described in block 512 not having a source address corresponding to the probe destination device 114.

At 516, the tunnel entrance device 104 may receive the third probe request described in block 514, decrement the hop limit value of the second probe request ([2]), and encapsulate the third probe into a tunneled message. During the encapsulation process, the tunnel entrance device 104 may copy the hop limit value of the third probe request into a hop limit value field of an IP tunnel header for the encapsulated third probe, rather than setting the hop limit of the tunnel header to a default value. As shown in block 516, the tunnel entrance device 104 may also set the source address of the tunnel header to its own address ([TS]), set the destination address of the tunnel header to tunnel exit device 112(1) ([TD]), and encapsulate the original probe data from block 514 ([TUNNELED-DATA 514]). The tunnel entrance device 104 may then send the tunneled probe request message to tunneled intermediate device 110(1).

At 518, the tunneled intermediate device 110(1) may receive the tunneled probe message described in block 516, decrement the hop limit value of the tunnel header to one, and send the tunneled message to the tunneled intermediate device 110(2). As such, the IP tunnel header for the tunneled message may have a source address corresponding to the tunnel source device 104 ([TS]), a destination address corresponding to the tunnel exit device 112(1) ([TD]), and a hop limit value of one ([1]).

At 520, the intermediate device 110(2) may receive the tunneled probe message described in block 518, decrement the hop limit value of the IP tunnel header to zero, and generate an ICMPv6 Hop Limit Exceeded error message. As shown in block 520, the IP header of the error message corresponds to tunneled intermediate device 110(2) ([I2]), the destination address of the IP tunnel header of the error message is set to tunnel entrance device 104 ([TS]), and the data from the tunneled message shown in block 518 is included in the error message. The tunneled intermediate device 110(2) may then send the error message to the tunnel entrance device 104.

At 522, the tunnel entrance device 104 may receive the error message described in block 520. In some instances, an application/daemon executing on the tunnel entrance device 104 may detect the error message, generate a new ICMPv6 Hop Limit Exceeded error message, and send the error message to the probe source device 102. In examples, the application/daemon executing on the tunnel entrance device 104 may perform address spoofing and set the source address of the IP header of the newly generated error message to the source address of tunneled intermediate device 110(2) who generated the original error message. As shown in block 522, the source address of the IP header of the error message corresponds to tunneled intermediate device 110(2) ([I2]), the destination address of the IP header of the error message is set to the probe source device 102 ([S]), and the data from the original probe message shown in block 514 is included in the error message. The tunnel entrance device 104 may then send the error message to the probe source device 102. The probe source device 102 may then receive the error message. Additionally, the traceroute application and/or the probe source device 102 may log the IP address corresponding to the tunneled intermediate device 110(2) contained in the error message and/or the roundtrip time for the exchange for performing network diagnostics, creating routing tables, etc.

At 524, the process may repeat and the traceroute application executing on the probe source device 102 may send a fourth probe request to the probe destination device 114. As shown in block 524, the source address of the IP header for the fourth probe corresponds to probe source device 102 ([S]), the destination address of the IP header for the fourth probe corresponds to probe destination device 114 ([D]), and the hop limit of the IP header for the fourth probe has been incremented and set to four ([4]). In some instances, sending the fourth probe request may be in response to receiving the error message from the tunneled intermediate device 110(2) described in block 522. In further examples, sending the fourth probe request may be based in part on the IP header of the error message described in block 522 not having a source address corresponding to the probe destination device 114.

At 526, the tunnel entrance device 104 may receive the fourth probe request described in block 524, decrement the hop limit value of the second probe request ([3]), and encapsulate the fourth probe into a tunneled message. During the encapsulation process, the tunnel entrance device 104 may copy the hop limit value of the fourth probe into a hop limit value field of an IP tunnel header for the encapsulated fourth probe, rather than setting the hop limit of the tunnel header to a default value. As shown in block 526, the tunnel entrance device 104 may also set the source address of the tunnel header to its own address ([TS]), set the destination address of the tunnel header to tunnel exit device 112(1) ([TD]), and encapsulate the original probe data from block 524 ([TUNNELED-DATA 524]). The tunnel entrance device 104 may then send the tunneled probe message to tunneled intermediate device 110(1).

At 528, the tunneled intermediate device 110(1) may receive the tunneled message describe in block 526, decrement the hop limit value of the tunnel header to two ([2]), and send the tunneled probe message to the tunneled intermediate device 110(2). As shown in FIG. 5, the IP tunnel header for the tunneled message corresponding to block 528 may have a source address corresponding to the tunnel entrance device 104 ([TS]), a destination address corresponding to the tunnel exit device 112(1) ([TD]), and a hop limit value of two ([2]).

At 530, the tunneled intermediate device 110(2) may receive the tunneled probe message described in block 528, decrement the hop limit value of the tunnel header to one ([1]), and send the tunneled message to the tunnel exit device 112(1). This process may be the same as, or similar to, the process described above in block 528.

At 532, the tunnel exit device 112(1) may receive the tunneled probe request message describe above in block 530. In examples, the tunnel exit device 112(1) may de-encapsulate the tunneled probe request message from block 530. Because the hop limit value of the tunnel header was decremented by tunneled intermediate devices 110(1) and 110(2) the hop limit value of the encapsulated fourth probe request may no longer be the same as the hop limit value of the IP tunnel header of the encapsulated fourth probe. Accordingly, the tunnel exit device 112(1) may copy the hop limit value of the IP tunnel header into a hop limit field of the fourth probe request packet. In this way, the tunnel exit device may decrement the new hop limit value of the fourth probe request to zero. In response, and as shown in block 532, the tunnel exit device 112(1) may generate a hop limit exceeded error message to send back to the probe source device 102. In doing so, the tunnel exit device 112(1) may encapsulate the new error message within a tunneled IP header in order to send the error message back through the routing tunnel to the probe source device 102. As used herein, the data in block 532 uses the following convention: [tunnel header source address] [tunnel header destination address] [error message source address] [error message destination address]. As shown in block 532, the IP tunnel header may contain a source address corresponding to the tunnel exit device 112(1) ([TD]) and a destination address corresponding to the tunnel entrance device ([TS]). Additionally, the encapsulated data (i.e. the original error message before encapsulation) may contain a source address corresponding to the tunnel exit device 112(1) ([TD]), and a destination address corresponding to the probe source device 102 ([S]). The tunnel exit device 112(1) may then send the tunneled message to the tunnel entrance device 104 via the routing tunnel.

At 534, the tunnel entrance device 104 may receive the tunneled error message described in above in block 532. The tunneled error message from block 532 may have been forwarded by the tunneled intermediate devices 110(1) and 110(2) after being sent from the tunnel exit device 112(1). In response to receiving the tunneled error message, the tunnel entrance device 104 may de-encapsulate the tunneled error message and send the original error message (i.e. the ICMPv6 Hop Limit Exceeded error message that was originally generated by the tunnel exit device 112(1) before being encapsulated) to the probe source device 102. The probe source device 102 may then receive the error message. Additionally, the traceroute application and/or the probe source device 102 may log the IP address corresponding to the tunneled intermediate device 110(2) contained in the error message and/or the roundtrip time for the exchange for performing network diagnostics, creating routing tables, etc.

At 536, the traceroute application executing on the probe source device 102 may send a fifth probe request to the probe destination device 114. As shown in block 536, the source address of the IP header for the fifth probe corresponds to probe source device 102 ([S]), the destination address of the IP header for the fifth probe corresponds to probe destination device 114 ([D]), and the hop limit of the IP header for the fifth probe has been incremented and set to five ([5]). In some instances, sending the fifth probe request may be in response to receiving the error message from the tunnel exit device 112(1) described in block 534. In further examples, sending the fifth probe request may be based in part on the IP header of the error message described in block 534 not having a source address corresponding to the probe destination device 114.

At blocks 538, 540, and 542, the fifth probe request may be routed through the IP network to the tunnel exit device 112(1) by a routing process that may be the same as, or similar to, the routing process described above for blocks 526, 528, and 530. As such, when the tunneled probe message of block 542 is sent to the tunnel exit device 112(1), the hop limit value of the outer IP header may be equal to two ([2]), while the hop limit value of the inner probe message may be equal to ([4]).

At block 544, the tunnel exit device 112(1) may receive the tunneled probe request message describe above in block 542. In response, the tunnel exit device 112(1) may de-encapsulate the tunneled probe request message. As described above in block 532, the hop limit value of the encapsulated (inner) fifth probe request may no longer be the same as the hop limit value of the IP tunnel header of the (outer) tunneled fifth probe. Accordingly, the tunnel exit device 112(1) may copy the hop limit value of the IP tunnel header into a hop limit field of the fifth probe request packet. In this way, the tunnel exit device 112(1) may decrement the new hop limit value of the fifth probe request to one ([1]). Accordingly, the tunnel exit device 112(1) may send the fifth probe to the probe destination device 114. As shown in FIG. 5, the probe request sent by the tunnel exit device 112(1) to the probe destination device 114 may have a source address of [S] (probe source device 102), a destination address of [D] (probe destination device 114), and a hop limit value of one ([1]).

At 546, the probe destination device 114 may receive the probe request described in 544. In examples, and as illustrated in FIG. 5, because the fifth probe request is sent to an unknown and/or unused UDP port of the probe destination device 114, probe destination device 114 may generate an ICMPv6 Port Unreachable error message. As shown in block 546, the source address of the IP header of the error message corresponds to probe destination device 114 ([D]), the destination address of the IP tunnel header of the error message is set to probe source device 102 ([S]), and the data from the probe message shown in block 544 is included in the error message. The probe destination device 114 may then send the error message to the probe source device 102 back through the same routing path that the fifth probe message came through.

At 548, the tunnel exit device 112(1) may receive the error message from the probe destination device 114 described above in block 546. In response, the tunnel exit device 112(1) may encapsulate the error message within a tunneled IP header in order to send the error message through the routing tunnel. As shown in block 548, the IP tunnel header may contain a source address corresponding to the tunnel exit device 112(1) ([TD]) and a destination address corresponding to the tunnel entrance device ([TS]). Additionally, the encapsulated data (i.e. the original error message sent from the probe destination device 114 before encapsulation) may contain a source address corresponding to the probe destination device 114 ([D]), and a destination address corresponding to the probe source device 102 ([S]). The tunnel exit device 112(1) may then send the tunneled message to the tunnel entrance device 104 via the routing tunnel.

At 550, the tunnel entrance device 104 may receive the tunneled error message described in block 548. The tunneled error message from block 548 may have been forwarded by the tunneled intermediate devices 110(1) and 110(2) after being sent from the tunnel exit device 112(1). In response to receiving the tunneled error message, the tunnel entrance device 104 may de-encapsulate the tunneled error message and send the original error message (i.e. the ICMPv6 Port Unreachable error message that was originally generated by the probe source device 114 before being encapsulated) to the probe source device 102. The probe source device 102 may then receive the port unreachable error message and, in response to detecting that it is a port unreachable error message sent from the probe destination device 114, the traceroute application may terminate execution. Additionally, the traceroute application and/or the probe source device 102 may log the IP address corresponding to the probe destination device 112(1) and/or the roundtrip time for the exchange for performing network diagnostics, creating routing tables, etc.

Figure 6:
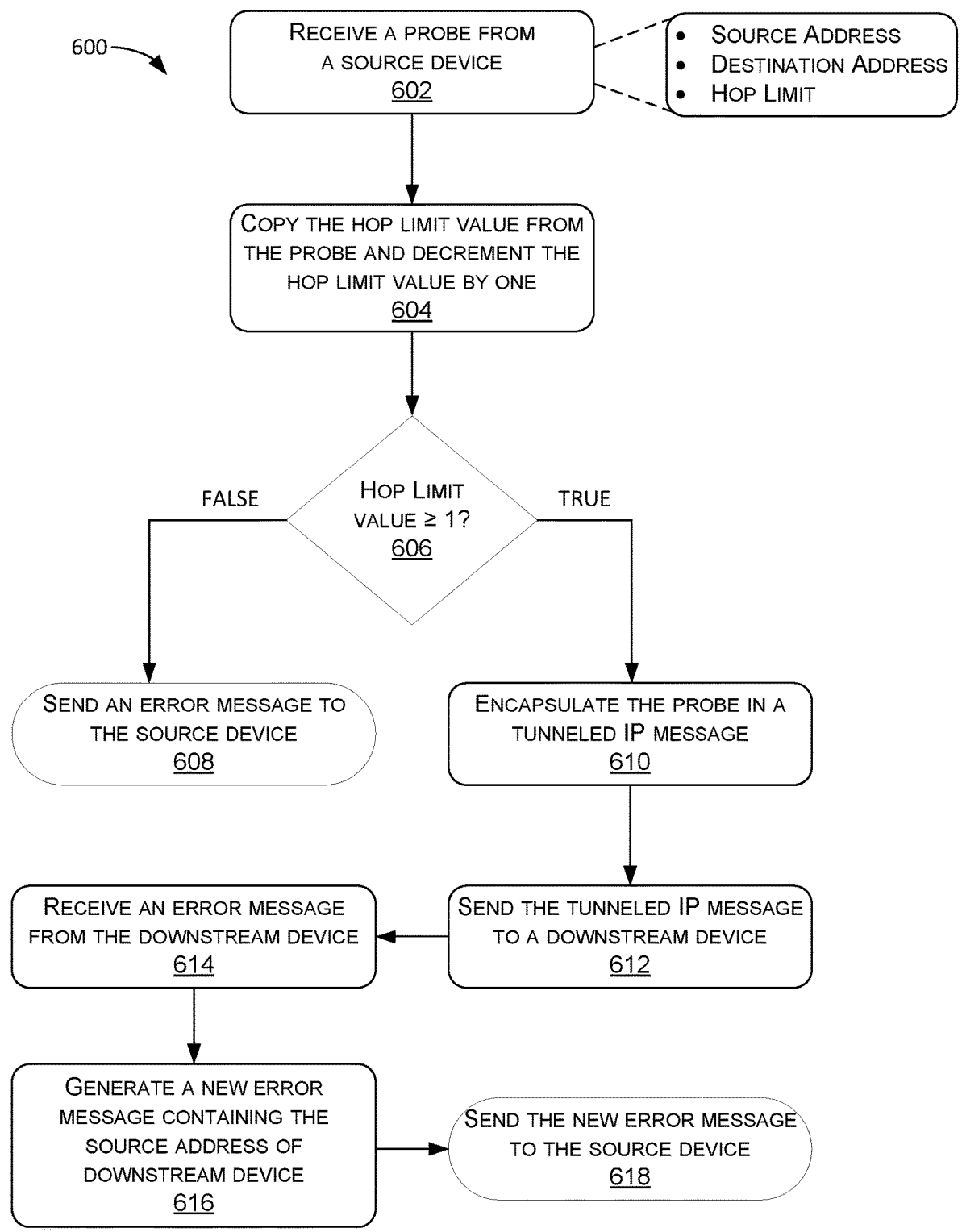
FIG. 6 is a flowchart illustrating an example process by which a tunnel entrance device may provide a probe source device with data corresponding to a tunneled device.
Figure 7:
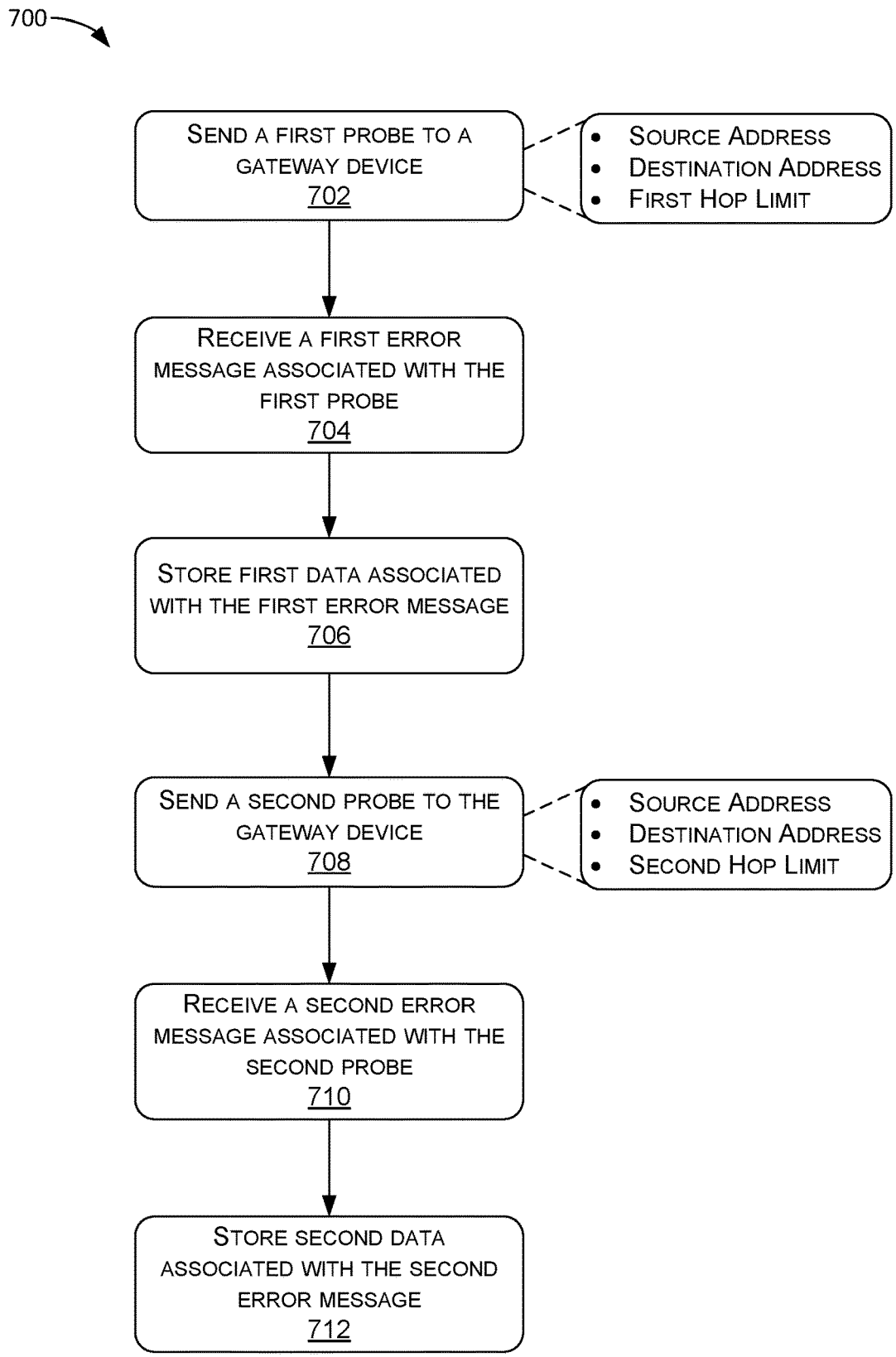
FIG. 7 is a flowchart illustrating an example traceroute process by which a probe source device may receive data associated with a tunneled device.

FIGS. 6 and 7 illustrate example processes 600 and 700 for employing the techniques discussed herein. For ease of illustration, the processes 600 and 700 may be described as being performed by a device described herein, such as the probe source device 102 and/or the tunnel entrance device 104. However, the processes 600 and 700 may be performed by other devices. Moreover, the devices may be used to perform other processes.

The processes 600 and 700 (as well as each process described herein) are illustrated as a logical flow graph, each operation of which represents a sequence of operations that can be implemented in hardware, software, or a combination thereof. In the context of software, the operations represent computer-readable instructions stored on one or more computer-readable storage media that, when executed by one or more processors, perform the recited operations. Generally, computer-readable instructions include routines, programs, objects, components, data structures, and the like that perform particular functions or implement particular abstract data types. In some contexts of hardware, the operations may be implemented (e.g., performed) in whole or in part by hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The order in which the operations are described is not intended to be construed as a limitation, and any number of the described operations can be combined in any order and/or in parallel to implement the process. Further, any number of the described operations may be omitted.

FIG. 6 is an example process by which a tunnel entrance device, such as tunnel entrance device 104, may provide a probe source device, such as probe source device 102, with traceroute data for a tunneled intermediate device in a routing tunnel of an IP network.

At 602, a tunnel entrance device 104 may receive a probe from a probe source device 102. The probe may contain an IP header comprising a source address, a destination address, and a hop limit value. Additionally, a traceroute application executing on the probe source device 102 may have sent the probe to the tunnel entrance device 104.

At 604, the tunnel entrance device 104 may copy the hop limit value contained in the IP header of the probe. In doing so, the tunnel entrance device 104 may decrement hop limit value that it copied from the original probe.

At 606, the tunnel entrance device 104 may evaluate the hop limit value to determine if the hop limit value, after being decremented, is greater than or equal to one. If the tunnel entrance device 104 determines that the hop limit value is less than one, i.e. if the hop limit value equals zero, then the process proceeds to 608. Alternatively, if the hop limit value is greater than or equal to one, the process proceeds to 610.

At 608, the tunnel entrance device 104 may send an error message to the probe source device 102. In some instances, the error message may be sent because the hop limit value of the probe was equal to zero and/or because the destination address of the probe was the same as the address of the tunnel entrance device 104. Further, in examples the error message may be an ICMPv6 Hop Limit Exceeded in Transit packet, or another type of message.

At 610, the tunnel entrance device 104 may encapsulate the probe within a tunneled IP message. The tunneled IP message may comprise an IP tunnel header. In examples, during an encapsulation process, the tunnel entrance device 104 may insert the hop limit value used in step 606 into a hop limit value field of the IP tunnel header. In this way, the hop limit value of the probe described in step 602 is copied and decremented in step 604, and accordingly inserted into an IP tunnel header of the encapsulated probe. Further, the IP tunnel header may comprise a source address corresponding to the tunnel entrance device 104 and a destination address corresponding to a downstream device. In examples, the downstream device may be a tunneled intermediate device 110 disposed within a routing tunnel of an IP network between the tunnel entrance device 104 and the probe destination device 114.

At 612, the tunnel entrance device 104 may send the tunneled IP message to a downstream device. As noted above with respect to step 610, the downstream device may be a tunneled intermediate device 110 disposed within a routing tunnel of an IP network between the tunnel entrance device 104 and one or more probe destination devices 114. In examples, the downstream device may be a single probe destination device 114, which may be disposed within the routing tunnel of the IP network.

At 614, the tunnel entrance device 104 may receive an error message from the downstream device described above in step 612. In some instances, a background application/daemon executing on the tunnel entrance device 104 may detect that the error message may be an ICMPv6 Port Unreachable packet. In examples, the application/daemon may detect that the error message may be an ICMPv6 Hop Limit Exceeded in Transit packet. Further, the error message may comprise a source address corresponding to a downstream device, and a destination address corresponding to the tunnel entrance device 104. In examples, the source address corresponding to the downstream device may correspond to a tunneled intermediate device that is disposed within a routing tunnel of an IP network located between the tunnel entrance device 104 and a probe destination device 114.

At 616, the background application/daemon executing on the tunnel entrance device 104 may, based in part on detecting that the received message in step 614 is an error message, generate a new error message. In examples, the background application/daemon may perform address spoofing to set the source address of the new error message to the source address of the downstream device that generated the original error message described in step 614.

At 618, the background application/daemon executing on the tunnel entrance device 104 may send the new error message to the probe source device 102, which sent the probe describe in step 602.

FIG. 7 is a flowchart illustrating a process by which a probe source device may receive routing path and transit delay time data from a tunneled device. Take for example, probe source device 102 receiving such data from tunneled intermediate devices 110.

At 702, a traceroute application executing on the probe source device 102 may send a first probe to a tunnel entrance device 104. The probe may contain an IP source address corresponding to the probe source device 102, an IP destination address corresponding to a probe destination device 114, and a first hop limit value.

At 704, the probe source device 102 may receive a first error message associated with the first probe described above with respect to step 702. In some instances, the error message may be an ICMPv6 Hop Limit Exceeded in Transit packet or other type of message.

At 706, the traceroute application executing on the probe source device 102 and/or probe source device 102 may store first data associated with the first error message. In some instances, the first data may comprise an IP source address of a downstream device that generated the error message. Further, the downstream device may be a tunneled intermediate device 110 disposed within a routing tunnel located between the tunnel entrance device 104 and a probe destination device 114 corresponding to the IP destination address discussed above in step 704. In examples, the first data may further comprise a round trip or transit delay time associated with lapse in time between a moment when the first probe was sent by the probe source device 102 and a moment when the first error message was received by the probe source device 102.

At 708, the traceroute application executing on the probe source device 102 may send a second probe to the tunnel entrance device 104. The probe may contain the IP source address corresponding to the probe source device 102, the IP destination address corresponding to the probe destination device 114, and a second hop limit value. In examples, the second probe may be sent based in part on receiving the first error message described in step 704.

At 710, the probe source device 102 may receive a second error message associated with the second probe described above with respect to step 708. In some instances, the error message may be an ICMPv6 Hop Limit Exceeded in Transit packet.

At 712, the traceroute application executing on the probe source device 102 and/or the probe source device 102 may store second data associated with the second error message. In some instances, the second data may comprise an IP source address of a downstream device that generated the error message. Further, the downstream device may be a tunneled intermediate device 110 disposed within a routing tunnel located between the tunnel entrance device 104 and a probe destination device 114. In examples, the downstream device may be the probe destination device 114 corresponding to the IP destination address discussed above in step 708. In examples, the second data may further comprise a round trip or transit delay time associated with a lapse in time between a moment when the second probe was sent by the probe source device 102 and a moment when the second error message was received by the probe source device 102.

Figure 8:
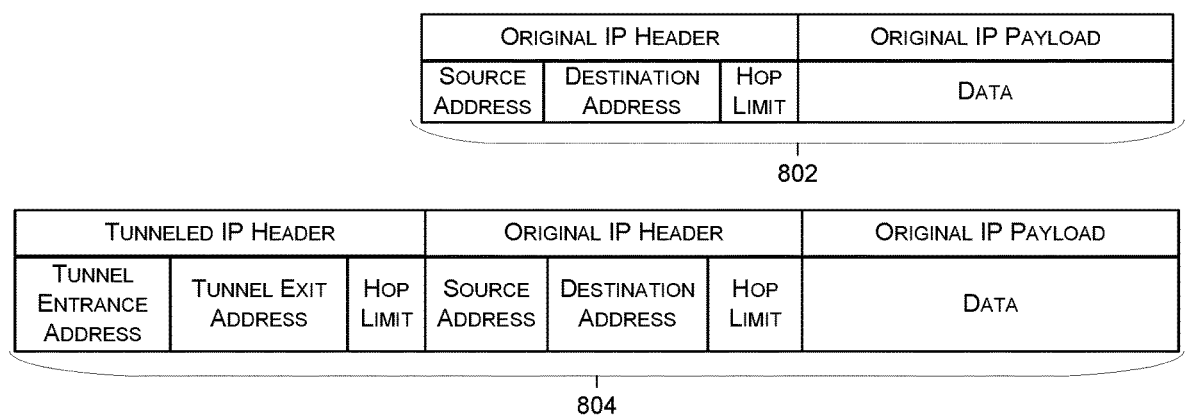
FIG. 8 is a schematic diagram illustrating example IP packet encapsulation.

FIG. 8 is a schematic illustrating example IP packet encapsulation, which may, but need not necessarily be used in connection with the techniques described herein. FIG. 8 is just one example of IP packet encapsulation, and should not be read as to limit the scope of the methods described herein. Furthermore, although FIG. 8 is an example embodiment showing a UDP packet, the methods described herein may be performed on other protocols, such as TCP, ICMPv6, ICMPv4, or other protocols, for example.

Packet 802 illustrates a common transport layer for an IP packet. In examples described herein, packet 802 may resemble a data structure comparable to a probe sent from a probe source device 102. As shown, packet 802 may contain an original IP header and an original IP payload. The original IP header may comprise a source IP address, a destination IP address, as well as a hop limit or TTL value. In examples as described herein, the source IP address may correspond to probe source device 102 and the destination IP address may correspond to probe destination device 114. Additionally, the original IP payload may comprise various data that may make up the body of the message that is being sent from the source IP address to the destination IP address.

Encapsulated packet 804 illustrates an encapsulation of the packet described in 802. In examples described herein, encapsulated packet 804 may resemble a data structure comparable to a tunneled data message sent from a tunnel entrance device 104 to a tunneled intermediate device 110. As shown in FIG. 8, the encapsulated packet 804 may comprise the original packet 802 and the tunneled IP header. The tunneled IP header may comprise a tunnel probe source device IP address corresponding to a device, such as tunnel entrance device 104. The tunneled IP header may further comprise an IP address corresponding to a tunnel exit device 112. The tunneled IP header may also comprise a hop limit value. In examples, the hop limit value of the tunneled IP header may be a less than that of the hop limit value of the original IP header.

CONCLUSION

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method, comprising:
   sending, to a tunnel entrance device from a probe source device, a first probe containing a destination device address of a destination device and a first hop limit value;
   receiving, from the tunnel entrance device, a first message associated with the first probe, the first message containing an address associated with an intermediate device, the intermediate device being part of a routing tunnel between the tunnel entrance device and the destination device; and
   based at least in part on receiving the first message:
      sending, to the tunnel entrance device, a second probe containing the destination device address and a second hop limit value;
      receiving, from the tunnel entrance device, a second message associated with the second probe, the second message containing the destination device address; and
      based at least in part on receiving a first error message, receiving from a program executed on the tunnel entrance device a second error message containing the second probe and an IP address corresponding to another intermediate device, the another intermediate device having generated the second error message.

2. The method as recited in claim 1, wherein the routing tunnel between the tunnel entrance device and the destination device further comprises one or more second intermediate devices.

3. The method as recited in claim 1, wherein the sending of the first probe, the sending of the second probe, the receiving of the first message, and the receiving of the second message are performed on an IPv4 protocol or an IPv6 protocol.

4. The method as recited in claim 1, wherein the probe source device is a network management system (NMS) operating on a backend utility network at a supervisory control and data acquisition (SCADA) center.

5. The method as recited in claim 1, wherein the second message comprises at least one of an ICMPv6 Port Unreachable packet or an ICMPv6 Echo Reply packet.

6. The method as recited in claim 1, wherein the first error message comprises a first ICMPv6 Hop Limit Exceeded in Transit packet.

7. A probe source device, comprising:
   one or more processors; and
   one or more computer-readable media storing computer-executable instructions that, when executed by the one or more processors, cause the one or more processors to perform operations comprising:

sending, to a tunnel entrance device, a first probe containing a destination device address of a destination device and a first hop limit value, receiving, from the tunnel entrance device, a first message associated with the first probe, the first message containing an address associated with an intermediate device, the intermediate device being part of a routing tunnel between the tunnel entrance device and the destination device;

based at least in part on receiving the first message:

sending, to the tunnel entrance device, a second probe containing the destination device address and a second hop limit value; and receiving, from the tunnel entrance device, a second message associated with the second probe, the second message containing the destination device address; and based at least in part on receiving the first message, receiving from a program executed on the tunnel entrance device the second message containing the second probe and an IP address corresponding to another intermediate device, the another intermediate device having generated the second message.

8. The probe source device as recited in claim 1, wherein the routing tunnel between the tunnel entrance device and the destination device further comprises one or more second intermediate devices.

9. The probe source device as recited in claim 7, wherein the first probe is configured in UDP, ICMPv6, or TCP protocol.

10. The probe source device as recited in claim 7, wherein the sending of the first probe, the sending of the second probe, the receiving of the first message, and the receiving of the second message are performed on an IPv4 protocol or an IPv6 protocol.

11. The probe source device as recited in claim 7, wherein the first message comprises an error message, the error message comprising an ICMPv6 Hop Limit Exceeded in Transit packet.

12. The probe source device as recited in claim 7, wherein the second message comprises at least one of an ICMPv6 Port Unreachable packet or an ICMPv6 Echo Reply packet.

13. A non-transitory computer-readable medium storing instructions that, when executed, causes a processor to perform operations, comprising:

sending, to a tunnel entrance device from a probe source device, a first probe containing a destination device address of a destination device and a first hop limit value;

receiving, from the tunnel entrance device, a first message associated with the first probe, the first message containing an address associated with an intermediate device, the intermediate device being part of a routing tunnel between the tunnel entrance device and the destination device; and based at least in part on receiving the first message:

sending, to the tunnel entrance device, a second probe containing the destination device address and a second hop limit value; and receiving, from the tunnel entrance device, a second message associated with the second probe, the second message containing the destination device address, wherein the first message comprises a first error message, the first error message comprising a first ICMPv6 Hop Limit Exceeded in Transit packet, the operations further comprising, based at least in part on receiving the first error message, receiving from a program executed on the tunnel entrance device a second error message containing the second probe and an IP address corresponding to another intermediate device, the another intermediate device having generated the second error message.

14. The non-transitory computer-readable medium of claim 13, wherein the routing tunnel between the tunnel entrance device and the destination device further comprises one or more second intermediate devices.

15. The non-transitory computer-readable medium of claim 13, wherein the sending of the first probe, the sending of the second probe, the receiving of the first message, and the receiving of the second message are performed on an IPv4 protocol or an IPv6 protocol.

16. The non-transitory computer-readable medium of claim 13, wherein the probe source device is a network management system (NMS) operating on a backend utility network at a supervisory control and data acquisition (SCADA) center.

17. The non-transitory computer-readable medium of claim 13, wherein the second message comprises at least one of an ICMPv6 Port Unreachable packet or an ICMPv6 Echo Reply packet.

* * * * *